United States Patent
Ebert et al.

(10) Patent No.: US 8,246,024 B2
(45) Date of Patent: Aug. 21, 2012

(54) BUSHING HAVING LIMIT STOPS

(75) Inventors: Michael Ebert, Berlin (DE); Andreas Hinze, Schoenwalde-Glien (DE); Andreas Erl, Henningsdorf (DE)

(73) Assignee: Carl Freudenberg KG, Weinheim (DE)

( * ) Notice: Subject to any disclaimer, the term of this patent is extended or adjusted under 35 U.S.C. 154(b) by 537 days.

(21) Appl. No.: 12/319,965

(22) Filed: Jan. 14, 2009

(65) Prior Publication Data
US 2009/0179362 A1 Jul. 16, 2009

(30) Foreign Application Priority Data
Jan. 15, 2008 (DE) .......... 10 2008 004 553

(51) Int. Cl.
*B60G 11/22* (2006.01)
(52) U.S. Cl. ............ 267/293; 267/140.12; 384/220
(58) Field of Classification Search ........... 267/293, 267/140.11, 140.12, 140.13, 141.2–141.7; 384/220
See application file for complete search history.

(56) References Cited

U.S. PATENT DOCUMENTS

| | | | | |
|---|---|---|---|---|
| 4,032,202 A | * | 6/1977 | Ishikawa et al. | 384/220 |
| 4,771,990 A | | 9/1988 | Donner et al. | 267/140.1 |
| 4,871,152 A | * | 10/1989 | Funahashi | 267/140.12 |
| 5,060,918 A | * | 10/1991 | Kanda | 267/140.12 |
| 5,725,202 A | * | 3/1998 | Nakamura et al. | 267/140.12 |
| 6,029,960 A | * | 2/2000 | Gab | 267/140.12 |
| 2006/0290040 A1 | | 12/2006 | Kumper | 267/281 |

FOREIGN PATENT DOCUMENTS

| | | |
|---|---|---|
| EP | 0 242 254 | 10/1987 |
| EP | 1607654 | 12/2003 |
| EP | 1 736 681 | 12/2006 |
| EP | 2218935 A1 * | 8/2010 |
| FR | 2827931 | 1/2003 |
| GB | 1 545 843 | 5/1979 |
| GB | 2 317 938 | 4/1998 |
| GB | 2332728 | 6/1999 |
| SU | 879094 | 11/1981 |

* cited by examiner

*Primary Examiner* — Pamela Rodriguez
(74) *Attorney, Agent, or Firm* — Pearl Cohen Zedek Latzer, LLP

(57) ABSTRACT

A bushing, having a core member, at least one enveloping body surrounding the same, and at least one elastic connecting layer, the elastic connecting layer joining together and spacing apart the enveloping body and the core member, and the core member and the enveloping body being movable relative to one another. In view of the object of designing and further refining a bushing of the type mentioned at the outset in such a way that it exhibits an adjustable stiffness response that is dependent on the deflection of the core member relative to the enveloping body, following the cost-effective manufacturing thereof, the bushing has at least one limit stop, which is structurally separate or is produced separately from the connecting layer, is assigned to the core member and/or the enveloping body and limits the relative movement thereof.

18 Claims, 5 Drawing Sheets

BUSHING HAVING LIMIT STOPS

This application claims the benefit of German Patent Application No. 10 2008 004 553.5 filed Jan. 15, 2008 and hereby incorporated by reference herein.

The present invention relates to a bushing, having a core member, at least one enveloping body surrounding the same, and at least one elastic connecting layer, the elastic connecting layer joining together and spacing apart the enveloping body and the core member, and the core member and the enveloping body being movable relative to one another.

BACKGROUND OF THE INVENTION

Bushings of the type mentioned at the outset are already known from the European Patent Application EP 1 736 681 A1. In the known bushings, the core member is composed of a tube, which is concentrically surrounded by a tube having a larger inside diameter. The two tubes are joined together by a rubber layer, the rubber layer being vulcanized to the tubes.

The known bushings are used as bearing elements in all types of motor vehicles. The known bushings exhibit an axially symmetric stiffness response in the radial load direction when the inner tube is displaced relative to the outer tube. The stiffness response is quasi frozen in the bushing following the manufacturing thereof.

SUMMARY OF THE INVENTION

It is often necessary in practice, however, to adjust the stiffness response of the bushing as a function of the deflection of the core member relative to the enveloping body. For example, it is desirable when the restoring force, which attempts to bring the core member and the enveloping body to their neutral position, respectively initial position, varies as a function of the deflection.

An object of the present invention is, therefore, to design and further refine a bushing of the type mentioned at the outset in a way that will enable it to exhibit an adjustable stiffness response that is dependent on the deflection of the core member relative to the enveloping body, following the cost-effective manufacturing thereof.

Accordingly, a bushing of the type mentioned at the outset is characterized in that at least one limit stop, which is structurally separate or is produced separately from the connecting layer, is assigned to the core member and/or the enveloping body and limits the relative movement thereof.

The present invention has recognized that at least one insertable limit stop, which is structurally separate from the elastic connecting layer, allows a different stiffness response to be impressed upon the bushing. Quite specifically, it has been recognized that, once the connecting layer has been arranged, a limit stop, which is separate or produced separately from the connecting layer, may be inserted into the bushing, for example by vulcanization.

In terms of material, this limit stop may be selected independently of the connecting layer. In accordance with the present invention, the limit stop that is insertable as a separate part may produce different restoring forces in response to varying degrees of deflection. The limit stop may be modified independently of the connecting layer. A variably adjustable bushing is hereby devised, which, in terms of its stiffness response, is adaptable to a multiplicity of applications. As a result, the objective stated at the outset is achieved.

Against this background, it is conceivable for the elastic connecting layer to have cutout recesses for receiving the limit stop, the cutout recesses allowing a relative movement over a free path or a free angle. The cutout recesses allow a resistance to movement, which is exclusively defined by the elastic connecting layer, to act over a free path or a free angle. A free angle occurs when the core member is rotated or subject to torsional stress relative to the enveloping body. In response to such a torsion, the elastic connecting layer is twisted and counteracts the torsional stress with a restoring force in the form of torque.

The core member or the enveloping body may be movable over the free path or the free angle against a first restoring force. This specific embodiment ensures that at least two response characteristics are able to be impressed upon the bushing. In this context, the first response characteristic is characterized by a first stiffness and a second response characteristic by a second stiffness, which take effect after the core member or the enveloping body engages on one of the limit stops.

Against this background, after engaging on the limit stop, the core member or the enveloping body may be movable over a braking path or a braking angle against a second resistance to movement. As a result, a bushing having at least two response characteristics is able to be devised.

The limit stop may be formed as an elastic body. Against this background, it is conceivable that the limit stop be formed from rubber or elastomer. Rubber and elastomers are able to be easily structured to smooth the stiffness response characteristics in the transitional regions. Elastomers are able to be readily vulcanized to metallic objects. Forming the limit stop as an elastic body makes it possible to adjust the second restoring force, respectively the second stiffness response characteristic of the bushing.

The elastic connecting layer may have recesses for modifying the radial and/or axial stiffness of the bushing. Against this background, it is conceivable for hollow spaces of any geometric shape to be formed in the elastic connecting layer and to thereby lower or modify the stiffness of the bushing in at least one spatial direction.

The core member may have a multipart design. This specific embodiment makes it possible to stabilize the core member. Moreover, it is possible to increase the axial extent of the core member by adding insertion members or slip-on members.

The core member may be composed of a receiving sleeve in which at least one insertion member is accommodated. Moreover, it is conceivable for an insertion member to be introduced into each of the sides of the receiving sleeve. In this manner, the axial extent of the core member may be increased as compared to the enveloping body. The insertion members may be bonded into place in the receiving sleeve. Moreover, it is conceivable for the insertion members to be accommodated by a press fit in the receiving sleeve.

The insertion member may have an overlapping element which rests on an orifice rim of the receiving sleeve. This ensures an immovable engagement of the insertion member.

A limit stop may be configured on the insertion member. This specific embodiment makes it possible to provide limit stops which exhibit a different stiffness response than the elastic connecting layer. Insertion members having limit stops of different stiffness response characteristics may be inserted completely in dependence upon the use intended for the bushing. In this respect, the bushing is readily and modularly adaptable to various fields of application.

The core member may be composed of a receiving sleeve on which at least one insertion member is located. This specific embodiment makes it possible for the rim region of the receiving sleeve to be stabilized against deformation. The slip-on members may substantially reinforce the rim region of the receiving sleeve.

The slip-on member may be mounted on a shoulder of the receiving sleeve and have a limit stop. This specific embodiment makes it possible for the slip-on member to be accommodated immovably. Moreover, a modular design of the bushing in terms of its stiffness characteristic is conceivable when, namely, slip-on members having limit stops of a different elasticity are fitted onto the receiving sleeve.

The enveloping body may have a multipart design. This enables the enveloping body to be modularly provided with limit stops in order to modify the stiffness response characteristics of the bushing.

Against this background, the enveloping body may have at least one insertion member having a limit stop. The enveloping body may be hereby strengthened against deformations.

The enveloping body may have at least one slip-on member having a limit stop. This makes it possible for the axial extent of the enveloping member to be increased. Moreover, the enveloping body may be strengthened against deformations.

The core member may be configured eccentrically to the enveloping body. A bushing of this kind exhibits a greater free travel in one radial direction than in another. By providing less free travel in one radial direction, the bushing may be adapted to situations which call for a narrow installation space.

At least one insertion member or one slip-on member may overlap the receiving sleeve or the outer sleeve at one axial end and rest against the same at the end face. This allows force components to be transmitted to the end face of the outer sleeve or of the receiving sleeve. Moreover, a stable end position of the insertion member or of the slip-on member is effected.

The teaching of the present invention may be advantageously embodied and further refined in different ways. In this regard, reference is made, on the one hand, to the subordinate claims and, on the other hand, to the following description of preferred exemplary embodiments of the bushing according to the present invention which makes reference to the drawing.

In conjunction with the explanation of the preferred exemplary embodiments of the present invention which makes reference to the drawing, generally preferred embodiments and refinements of the teaching are also elucidated.

DETAILED DESCRIPTION

Figure 1:
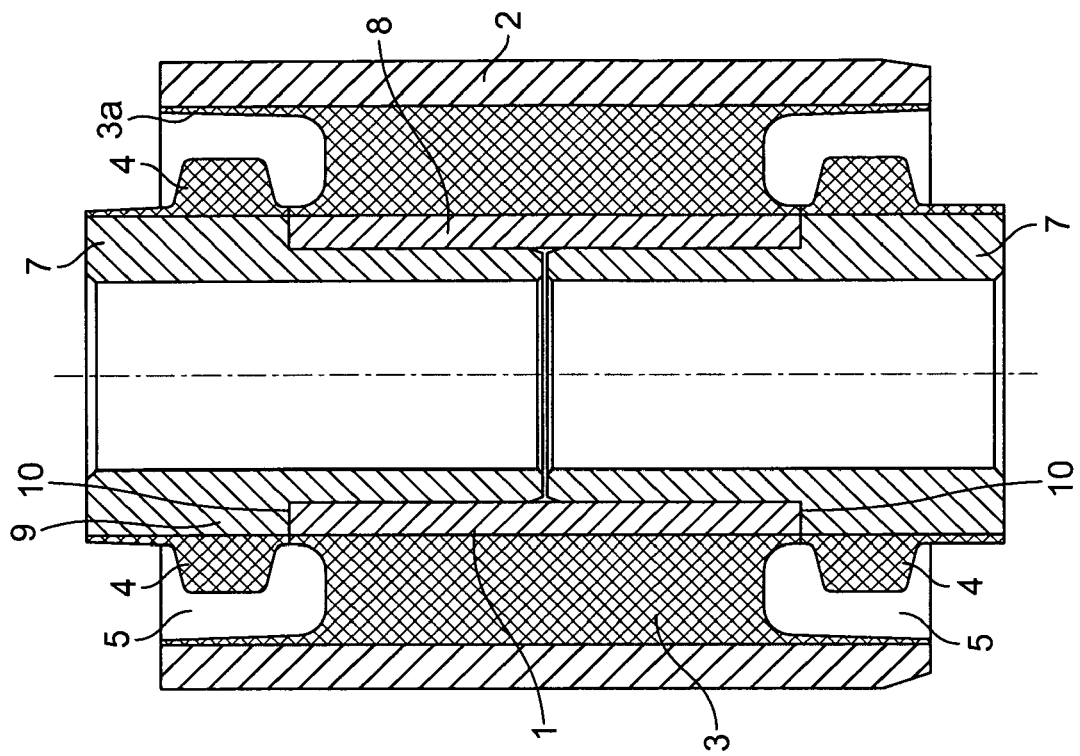
FIG. 1 a bushing having a core member and an enveloping body, limit stops being assigned to the enveloping body.

FIG. 1 shows a bushing having a core member 1 and an enveloping body 2 surrounding the same. An elastic connecting layer 3 joins together enveloping body 2 and core member 1. Moreover, elastic connecting layer 3 spaces apart enveloping body 2 and core member 1. Core member 1 is movable relative to the enveloping body. At least one limit stop 4 is assigned to enveloping body 2 and limits the movement of the core member relative to enveloping body 2. At least one limit stop 4, which is structurally separate or is produced separately from connecting layer 3, is assigned to enveloping body 2.

Elastic connecting layer 3 has cutout recesses 5 for receiving limit stops 4. Cutout recesses 5 allow a movement of core member 1 relative to enveloping body 2 over a free path or a free angle.

Core member 1 or enveloping body 2 are movable over the free path or the free angle against a first restoring force, respectively against a first resistance to movement. The first restoring force is defined by the stiffness of elastic connecting layer 3. After engaging on limit stop 4, core member 1 is movable over a braking path or a braking angle against a second restoring force, respectively a second resistance to movement which is defined by the stiffness of limit stops 4. Limit stop 4 is formed as an elastic body.

Enveloping body 2 has a multipart design. Specifically, enveloping body 2 has insertion members 6 which are inserted into orifices of a cylindrically formed outer sleeve 2a. Limit stops 4 are assigned to insertion members 6. Both limit stops 4, as well as elastic connecting layer 3 are joined by vulcanization to core member 1, enveloping body 2, respectively insertion members 6. Insertion members 6 are designed as rings. From FIG. 1, it is discernible that elastic connecting layer 3 has outwardly tapered flanks 3a, against which limit stops 4 make contact.

Although it is not shown in FIG. 1, insertion members 6 may be designed to overlap outer sleeve 2a at the end faces, i.e., at the axial ends thereof. The overlapping allows insertion members 6 to rest axially against outer sleeve 2a in order to achieve a secure end position. Moreover, in such a case, the thickness of outer sleeve 2a may be slightly weakened at the axial ends thereof, since the greatest force components are transmitted to the axial end face of outer sleeve 2a.

Figure 2:
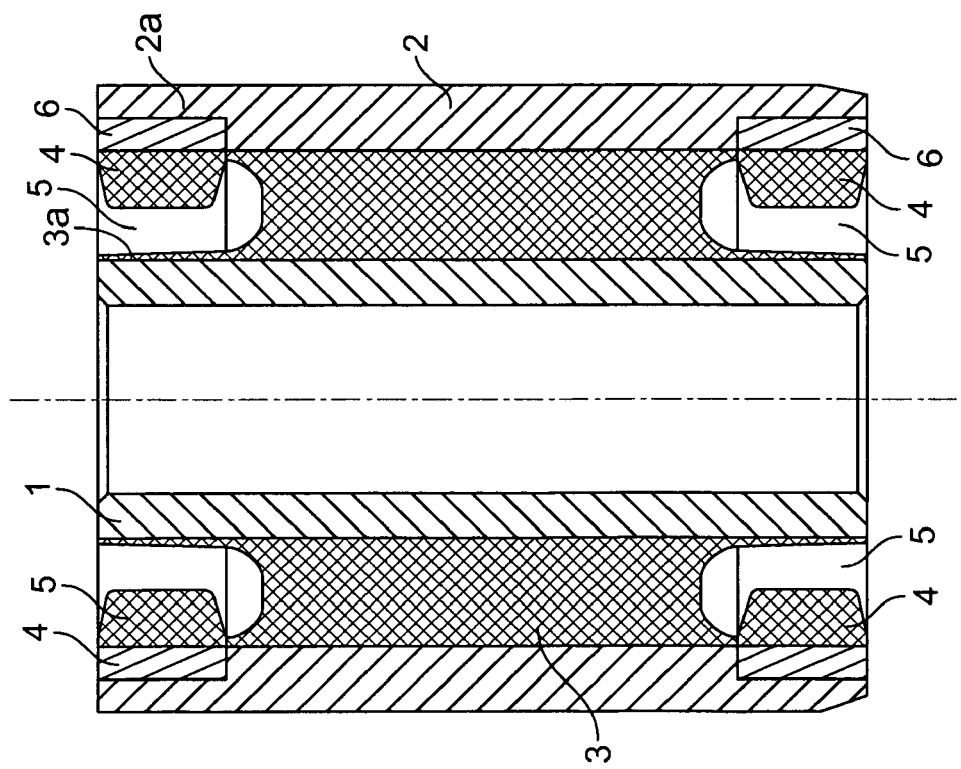
FIG. 2 a bushing having a multipart core member into which insertion members are inserted.

FIG. 2 shows a bushing having a multipart core member 1 which has insertion member 7. Limit stops 4 are assigned to insertion members 7. Enveloping body 2 has a one-piece design. An elastic connecting layer 3 joins together enveloping body 2 and core member 1. Elastic connecting layer 3 has cutout recesses 5 for receiving limit stops 4. Core member 1 has a receiving sleeve 8 into which insertion members 7 are inserted. Insertion members 7 are inserted in each instance at the orifices of cylindrically formed receiving sleeve 8. Insertion members 7 have overlapping elements 9 which come to rest on an orifice rim 10 of receiving sleeve 8. Limit stops 4, which are formed as elastic bodies, are configured on insertion members 7.

Figure 3:
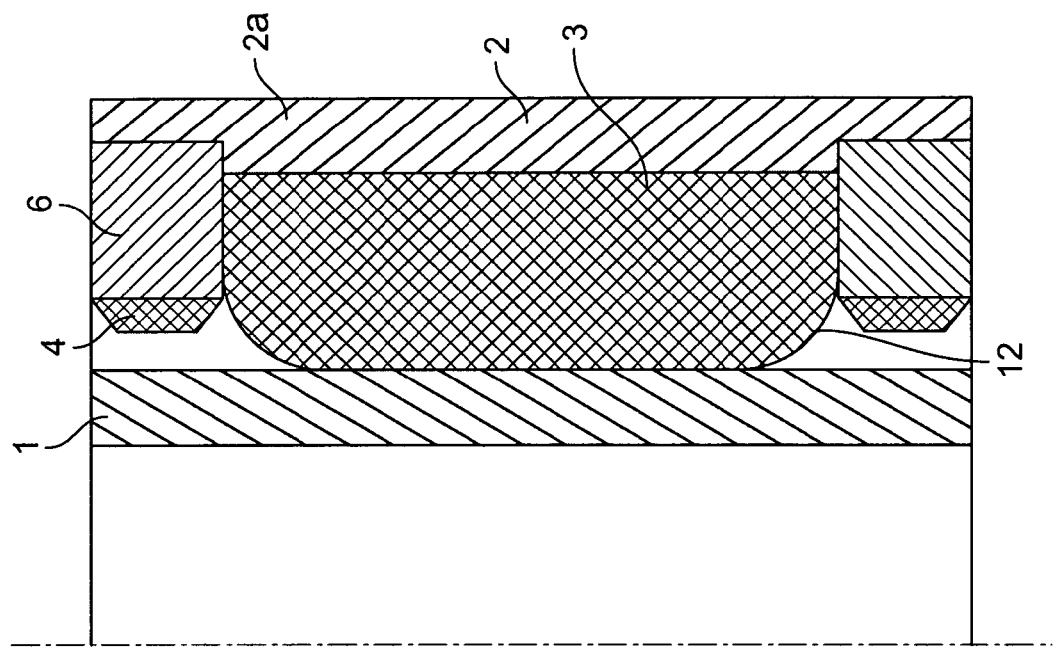
FIG. 3 a bushing having a multipart core member onto which slip-on members are fitted.

FIG. 3 shows a bushing having a multipart core member 1 which includes insertion members 11 having limit stops 4. Core member 1 has a cylindrical receiving sleeve 8 which is surrounded by annular slip-on members 11. Enveloping body 2 is joined to core member 1 by an elastic connecting layer 3 which has cutout recesses 5 for receiving limit stops 4. Although it is not shown in FIG. 3, slip-on members 11 may be designed to overlap receiving sleeve 8 at the end faces, i.e., at the axial ends thereof. The overlapping allows insertion members 11 to rest axially against receiving sleeve 8 in order to achieve a secure end position. Moreover, in such a case, the thickness of receiving sleeve 8 may be only slightly weakened at the axial ends thereof since the greatest force components may be transmitted to the axial end face of receiving sleeve 8.

Figure 4:
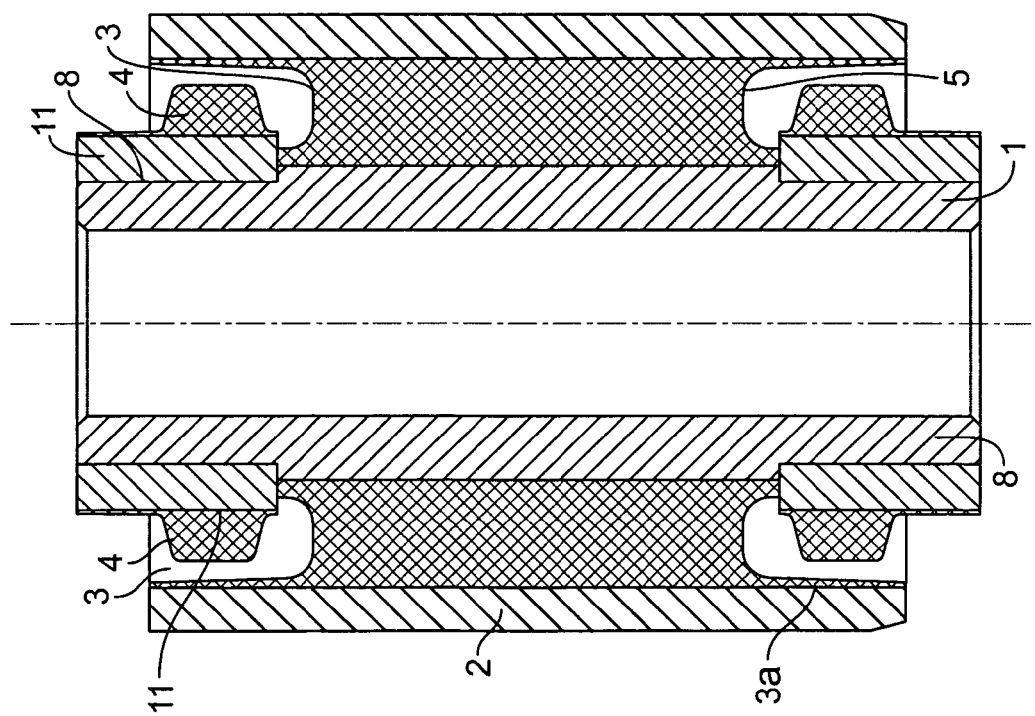
FIG. 4 a bushing having an elastic connecting layer which has rounded corners.

FIG. 4 shows a bushing having a core member 1 and an enveloping body 2, enveloping body 2 having a multipart design. Enveloping body 2 has insertion members 6 on which limit stops 4 are configured. Core member 1 is joined to enveloping body 2 by an elastic connecting layer 3 which has rounded corner sections 12.

Figure 5:
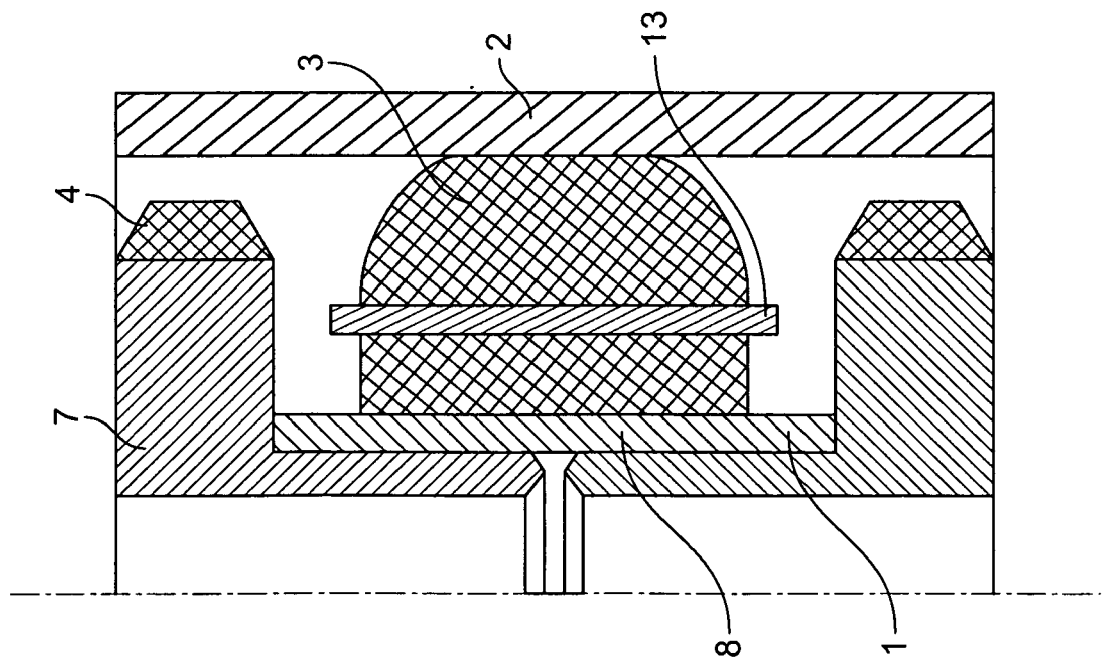
FIG. 5 a bushing having an elastic connecting layer in which a stiffening element is accommodated.

FIG. 5 shows a bushing where enveloping body 2 is joined to core member 1 via an elastic connecting layer 3 in which a stiffening element 13 is configured. Moreover, FIG. 5 shows a receiving sleeve 8 in which insertion members 7 having limit stops 4 are configured. Stiffening element 13 has an annular design and modifies the stiffness of connecting layer 3 in which it is embedded.

Figure 6:
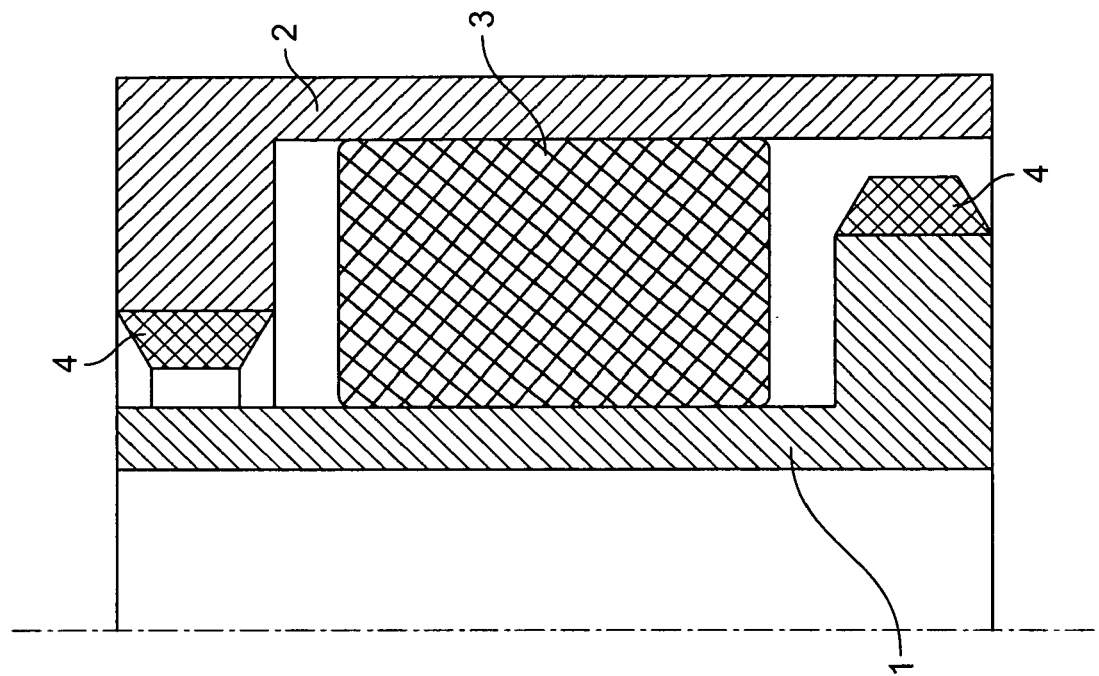
FIG. 6 a bushing where the limit stops are alternately configured on the enveloping body and the core member.

FIG. 6 shows a bushing having an enveloping body 2 and a core member 1 which are joined together by an elastic connecting layer 3. In the bushing in accordance with FIG. 6, limit stops 4 are alternately configured both on enveloping body 2, as well as on core member 1.

Figure 7:
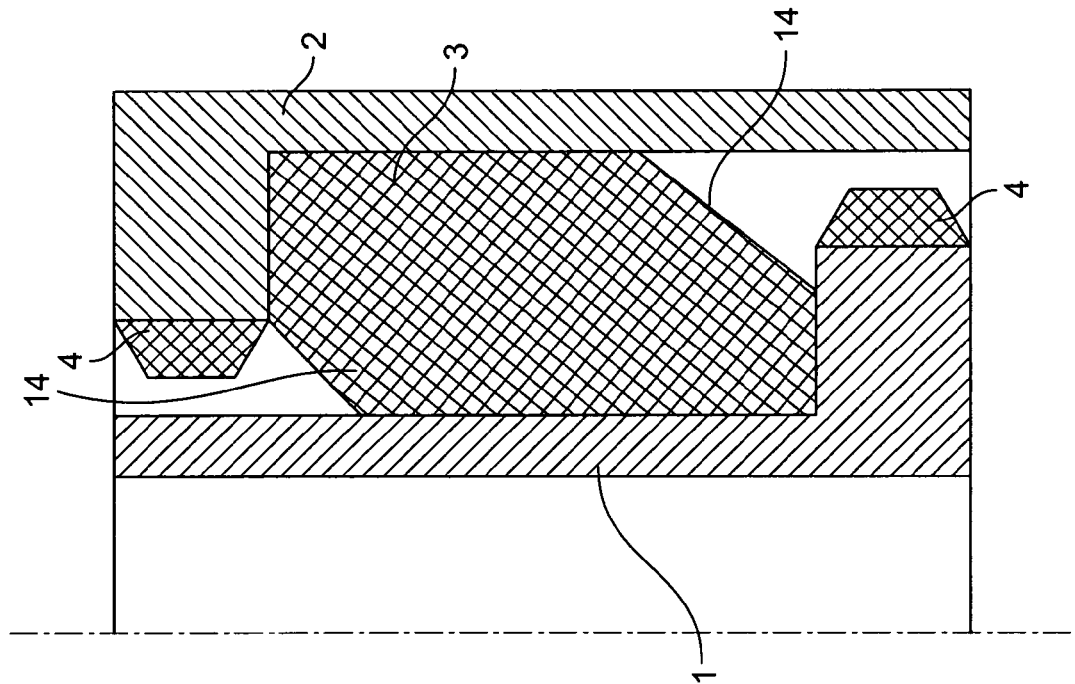
FIG. 7 a bushing where the elastic connecting layer has rounded corners, and the limit stops are assigned to the core member.

FIG. 7 shows a bushing having an enveloping body 2 and a core member 1 which are joined by an elastic connecting layer 3. Elastic connecting layer 3 has rounded corner sections 12. Core member 1 has a receiving sleeve 8 onto which slip-on members 11 having limit stops 4 are fitted.

Figure 8:
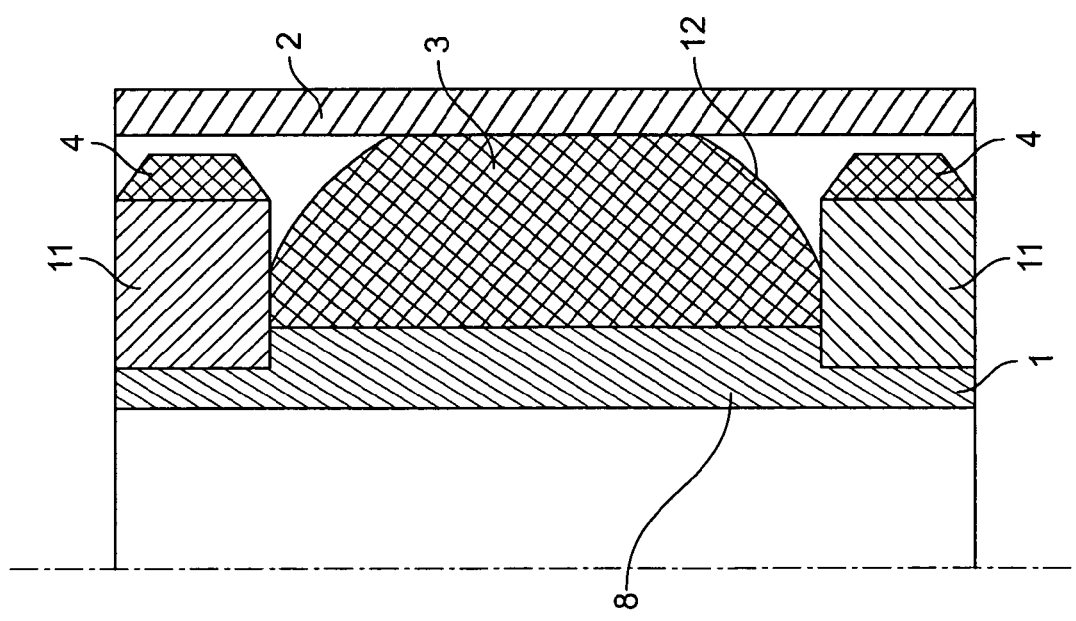
FIG. 8 a bushing where the limit stops are alternately assigned to the enveloping body and the core member, and where the elastic connecting layer has chamfered regions.

FIG. 8 shows a bushing having an enveloping body 2 and a core member 1 which are joined by an elastic connecting layer 3. Elastic connecting layer 3 has chamfers 14. The bushing in accordance with FIG. 8 shows limit stops 4 which are alternately assigned to core member 1 and enveloping body 2.

Figure 9:
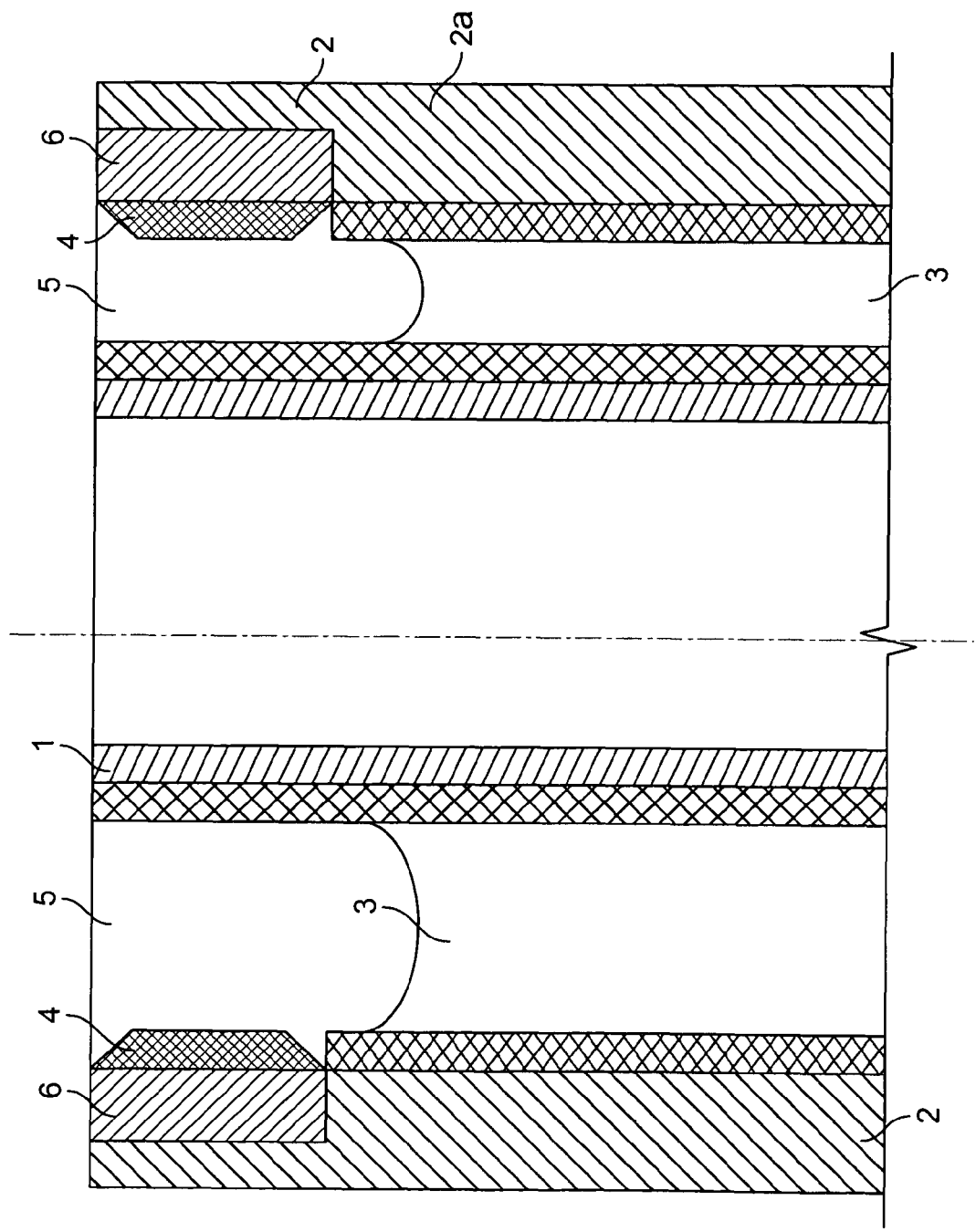
FIG. 9 a bushing where the core member is configured eccentrically relative to the enveloping body.

FIG. 9 shows a bushing having an eccentric configuration of core member 1 relative to enveloping body 2. This bushing has a greater free travel in one radial direction than in another. By providing less free travel, the bushing may be adapted to situations which call for a narrow installation space. The bushing has insertion members 6 having limit stops 4 which are inserted into an outer sleeve 2a of enveloping body 2. Core member 1 is joined to multipart enveloping body 2 by an elastic connecting layer 3. Connecting layer 3 has cutout recesses 5.

In the exemplary embodiments described here, limit stops 4 and elastic connecting layers 3 are fabricated from elastomers, in particular from rubber. Outer sleeve 2a, receiving sleeve 8, insertion members 6, 7 and slip-on members 11 are joined to the previously mentioned elastomers by vulcanization or are bonded thereto. In this context, limit stops 4 and elastic connecting layer 3 may be made of different elastomers in order to impress different stiffness response characteristics upon the bushing. In the exemplary embodiments in accordance with FIG. 1 through 9, elastic connecting layers 3 may be joined to core member 1 and/or to enveloping body 2 by vulcanization. Alternatively, a non-positive connection of core member 1, enveloping body 2 and connecting layer 3 is conceivable.

With regard to other advantageous embodiments and refinements of the teaching of the present invention, reference is made, on the one hand, to the general portion of the Specification and, on the other hand, to the appended claims.

Finally, it is especially emphasized that the above selected practical examples are merely intended for purposes of discussing the teaching of the present invention, but not for limiting it thereto.

The invention claimed is:

1. A bushing comprising:
 a core member, wherein said core member has a multipart design and is comprised of a receiving sleeve;
 at least one enveloping body surrounding the core member;
 at least one elastic connecting layer, the elastic connecting layer joining together and spacing apart the enveloping body and the core member, and the core member and the enveloping body being movable relative to one another;
 at least one limit stop structurally separate or produced separately from the connecting layer, the at least one limit stop being assigned to the core member and/or the enveloping body and limiting the relative movement thereof; and
 at least one insertion member, wherein the at least one insertion member is accommodated in the receiving sleeve and has an overlapping element resting on an orifice rim of the receiving sleeve.

2. The bushing as recited in claim 1, wherein the at least one limit stop is configured on the insertion member.

3. The bushing as recited in claim 1, wherein the elastic connecting layer has cutout recesses for receiving the limit stop, the cutout recesses allowing a relative movement over a free path or a free angle.

4. The bushing as recited in claim 3, wherein the core member or the enveloping body is movable over the free path or the free angle against a first restoring force.

5. The bushing as recited in claim 3, wherein, after engaging on the limit stop, the core member or the enveloping body is movable over a braking path or a braking angle against a second restoring force.

6. The bushing as recited in claim 5, wherein the limit stop is formed as an elastic body.

7. The bushing as recited in claim 1, wherein the elastic connecting layer has recesses for modifying the radial and/or axial stiffness.

8. The bushing as recited in claim 1, wherein the core member is composed of a receiving sleeve, at least one slip-on member being accommodated in the receiving sleeve.

9. The bushing as recited in clam 8, wherein the slip-on member is mounted on a shoulder of the receiving sleeve and has a limit stop.

10. The bushing as recited in claim 1, wherein the enveloping body has a multipart design.

11. The bushing as recited in claim 10, wherein the enveloping body comprises the at least one insertion member, and the at least one insertion member comprises the at least one limit stop.

12. The bushing as recited in claim 10, wherein the enveloping body has at least one slip-on member having a limit stop.

13. The bushing as recited in claim 1, wherein the core member is configured eccentrically to the enveloping body.

14. The bushing as recited in claim 1, wherein a stiffening element is embedded within the elastic connecting layer.

15. The bushing as recited in claim 1, wherein the elastic connecting layer has rounded corner sections.

16. A bushing comprising:
 a core member, wherein said core member has a multipart design and is comprised of a receiving sleeve;
 at least one enveloping body surrounding the core member;
 at least one elastic connecting layer, the elastic connecting layer joining together and spacing apart the enveloping body and the core member, and the core member and the enveloping body being movable relative to one another;

at least one limit stop structurally separate or produced separately from the connecting layer, the at least one limit stop being assigned to the core member and/or the enveloping body and limiting the relative movement thereof; and at least one insertion member, wherein said at least one insertion member is accommodated in the receiving sleeve, overlaps the receiving sleeve or an outer sleeve at one axial end and rests against the same at an end face.

17. The bushing as recited in claim 16, wherein a stiffening element is embedded within the elastic connecting layer.

18. The bushing as recited in claim 16, wherein the elastic connecting layer has rounded corner sections.

* * * * *